(12) United States Patent
Miyazoe et al.

(10) Patent No.: US 11,434,939 B2
(45) Date of Patent: Sep. 6, 2022

(54) WATERPROOF MANIFOLD ELECTROMAGNETIC VALVE

(71) Applicant: SMC CORPORATION, Chiyoda-ku (JP)

(72) Inventors: Shinji Miyazoe, Moriya (JP); Toru Fujiwara, Kodaira (JP); Takashi Murakami, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 351 days.

(21) Appl. No.: 16/485,951

(22) PCT Filed: Feb. 6, 2018

(86) PCT No.: PCT/JP2018/003890
§ 371 (c)(1),
(2) Date: Aug. 14, 2019

(87) PCT Pub. No.: WO2018/155153
PCT Pub. Date: Aug. 30, 2018

(65) Prior Publication Data
US 2020/0049169 A1 Feb. 13, 2020

(30) Foreign Application Priority Data

Feb. 22, 2017 (JP) .............................. JP2017-031324

(51) Int. Cl.
*F15B 13/08* (2006.01)
*F16K 27/04* (2006.01)
(Continued)

(52) U.S. Cl.
CPC ........ *F15B 13/0828* (2013.01); *F15B 13/081* (2013.01); *F15B 20/002* (2013.01); *F16K 27/048* (2013.01); *F16K 31/06* (2013.01)

(58) Field of Classification Search
CPC ................ F15B 13/081; F15B 13/0814; F15B 13/0817; F15B 13/0821; F15B 13/0825;
(Continued)

(56) References Cited

U.S. PATENT DOCUMENTS 3,504,704 A 4/1970 Beckett et al.
4,757,943 A 7/1988 Sperling et al.
(Continued)

FOREIGN PATENT DOCUMENTS

DE 94 11 684 U1 9/1994
EP 1 120 574 A1 8/2001
(Continued)

OTHER PUBLICATIONS

International Search Report dated May 1, 2018 in PCT/JP2018/003890 filed Feb. 6, 2018.
(Continued)

*Primary Examiner* — Kevin F Murphy
*Assistant Examiner* — Jonathan J Waddy
(74) *Attorney, Agent, or Firm* — Oblon, McClelland, Maier & Neustadt, L.L.P.

(57) ABSTRACT

A manifold includes multiple first valve mount portions, on each of which three electromagnetic valves are arranged side by side, or a plurality of second valve mount portions, on each of which two electromagnetic valves are arranged side by side, or includes at least one of the first valve mount portions and at least one of the second valve mount portions. Waterproof covers are attached to the valve mount portions of the manifold to each cover the three or two electromagnetic valves mounted on the valve mount portion. Thus, a waterproof manifold electromagnetic valve is formed.

9 Claims, 6 Drawing Sheets

(51) Int. Cl.
*F15B 20/00* (2006.01)
*F16K 31/06* (2006.01)

(58) Field of Classification Search
CPC .. F15B 13/0828; F15B 20/002; F16K 27/048; F16K 27/12
USPC ....................................................... 137/382
See application file for complete search history.

(56) References Cited

U.S. PATENT DOCUMENTS

| | | |
|---|---|---|
| 6,048,041 A | 4/2000 | Mueller et al. |
| 2001/0009165 A1 | 7/2001 | Notz et al. |
| 2003/0226527 A1 | 12/2003 | Herbert |
| 2003/0226606 A1 | 12/2003 | Hayashi et al. |
| 2008/0087346 A1* | 4/2008 | Takada ................ F15B 13/0828 137/884 |
| 2010/0282347 A1 | 11/2010 | Iijima et al. |
| 2012/0025116 A1 | 2/2012 | Murakami et al. |
| 2015/0267831 A1 | 9/2015 | Beschorner et al. |

FOREIGN PATENT DOCUMENTS

| | | |
|---|---|---|
| EP | 1 371 881 A2 | 12/2003 |
| JP | 11-511413 A | 10/1999 |
| JP | 2001-254859 A | 9/2001 |
| JP | 2004-11858 A | 1/2004 |
| JP | 2010-261558 A | 11/2010 |
| JP | 2012-31930 A | 2/2012 |

OTHER PUBLICATIONS

Extended European Search Report dated Oct. 28, 2020 in European Patent Application No. 18757667.3, citing documents AA-AD and AO-AQ therein, 12 pages.

* cited by examiner

WATERPROOF MANIFOLD ELECTROMAGNETIC VALVE

TECHNICAL FIELD

The present invention relates to a waterproof manifold electromagnetic valve including multiple electromagnetic valves disposed on a manifold and covered with a waterproof cover, or more specifically, a manifold electromagnetic valve including four or more electromagnetic valves.

BACKGROUND ART

Examples of a waterproof manifold electromagnetic valve including multiple electromagnetic valves mounted on a manifold and covered with a waterproof cover have various different structures, as disclosed in, for example, PTL 1 to 3. Such manifold electromagnetic valves are often attached to a food processor to control the food processor. In such cases, after the completion of the operation, the food processor is cleaned with a blow of high-temperature, high-pressure wash water or a steam jet. Thus, the waterproof cover of the manifold electromagnetic valve is usually supposed to bear, for example, a blow of high-temperature, high-pressure wash water or a steam jet.

In an existing manifold electromagnetic valve, however, multiple electromagnetic valves mounted on a manifold are collectively covered with one waterproof cover. Depending of the quantity of electromagnetic valves, the waterproof cover may fail to retain its strength. Specifically, a small-sized waterproof cover is used to cover a smaller quantity of, such as two or three, electromagnetic valves. Here, the waterproof cover has no problem in strength degradation. However, to cover a larger quantity of electromagnetic valves, the waterproof cover accordingly has a larger size, and thus may reduce its strength or may be distorted. To address this, as in the manifold electromagnetic valve disclosed in PTL 1 or PTL 3, a special measure needs to be taken to retain the strength of a waterproof cover by, for example, forming, on the waterproof cover, a reinforcing rib that is brought into contact with the electromagnetic valve to prevent the waterproof cover from being broken due to deformation.

CITATION LIST

Patent Literature

PTL 1: Japanese Unexamined Patent Application Publication No. 2012-31930
PTL 2: Japanese Unexamined Patent Application Publication No. 2004-11858
PTL 3: Japanese Unexamined Patent Application Publication (Translation of PCT Application) No. 11-511413

SUMMARY OF INVENTION

Technical Problem

A technical object of the present invention is to provide a structure including multiple small-sized waterproof covers to cover all of a large quantity of electromagnetic valves mounted on a manifold without the need for using a large-sized waterproof cover to solve a problem caused in a case where a large-sized waterproof cover is used.

Solution to Problem

To solve the above problem, a waterproof manifold electromagnetic valve according to the present invention includes a manifold including a plurality of first valve mount portions, on each of which three electromagnetic valves are arranged side by side at a predetermined inter-valve distance apart from each other, or a plurality of second valve mount portions, on each of which two electromagnetic valves are arranged side by side at the inter-valve distance apart from each other, or including at least one of the first valve mount portions and at least one of the second valve mount portions, and electromagnetic valves at end portions of valve mount portions adjacent to each other being spaced an inter-mount-portion distance larger than the inter-valve distance apart from each other; and waterproof covers attached to the respective valve mount portions of the manifold to each collectively cover the three or two electromagnetic valves mounted on the corresponding valve mount portion.

In the present invention, a gap is formed between adjacent waterproof covers, and the gap has such a size that is larger than the inter-valve distance, and smaller than the inter-mount-portion distance, and that allows a surface of the manifold to be exposed to an outside through the gap. The gap between the adjacent waterproof covers may gradually increase toward upper surfaces of the waterproof covers.

In the present invention, preferably, the waterproof covers have a thin and long shape extending in a lengthwise direction of the electromagnetic valves, upper surfaces of the waterproof covers curve outward into a convex shape in a lengthwise direction of the waterproof covers, and the curved shape is symmetric with respect to a center in the lengthwise direction of the waterproof covers, the waterproof covers are each screwed to the manifold at two positions that are a first end portion and a second end portion of the lengthwise direction and center portions in a widthwise direction, and first waterproof covers each covering three electromagnetic valves or second waterproof covers each covering two electromagnetic valves have the same shape and the same size.

In the present invention, each of the electromagnetic valves may include a manual button for a manual operation on an upper surface covered with the corresponding one of the waterproof covers, and each of the waterproof covers may have an operation hole that enables an operation of the manual button at a position corresponding to the manual button, and a hole cover may be attached to the operation hole.

Furthermore, in the present invention, the manifold may be a single-unit manifold, and the manifold includes all the valve mount portions. Alternatively, the manifold may be formed from multiple manifold blocks coupled to each other, and each of the manifold blocks includes at least one first valve mount portion and/or at least one second valve mount portion.

The waterproof manifold electromagnetic valve according to the present invention is obtainable in the following procedure. The procedure includes a step of dividing all the electromagnetic valves mounted on the manifold into at least one first valve group formed of three electromagnetic valves and/or at least one second valve group formed of two electromagnetic valves to determine a quantity of the first valve group and/or a quantity of the second valve group; a step of forming, on the manifold, at least one first mount area allowing three electromagnetic valves to be mounted thereon and/or at least one second mount area allowing two electromagnetic valves to be mounted thereon, a quantity of the first mount area being equal to a quantity of the first valve group, a quantity of the second mount area being equal to a quantity of the second valve group; a step of mounting three or two electromagnetic valves on each of the mount areas of the manifold to form at least one first valve mount portion on each of which three electromagnetic valves are mounted and/or at least one second valve mount portion on each of which two electromagnetic valves are mounted; and a step of attaching, to each of the valve mount portions of the manifold, a waterproof cover to cover the three or two electromagnetic valves mounted on the valve mount portion.

Advantageous Effects of Invention

The waterproof manifold electromagnetic valve according to the present invention can cover all the four or more electromagnetic valves mounted on a manifold with multiple small-sized waterproof covers for covering two or three electromagnetic valves. This waterproof manifold electromagnetic valve can solve a problem of strength degradation of a waterproof cover caused when a large-sized waterproof cover is used. The waterproof manifold electromagnetic valve can thus eliminate the need of taking a measure to retain the strength of a waterproof cover by, for example, forming a reinforcing rib on the waterproof cover.

DESCRIPTION OF EMBODIMENTS

Figure 1:
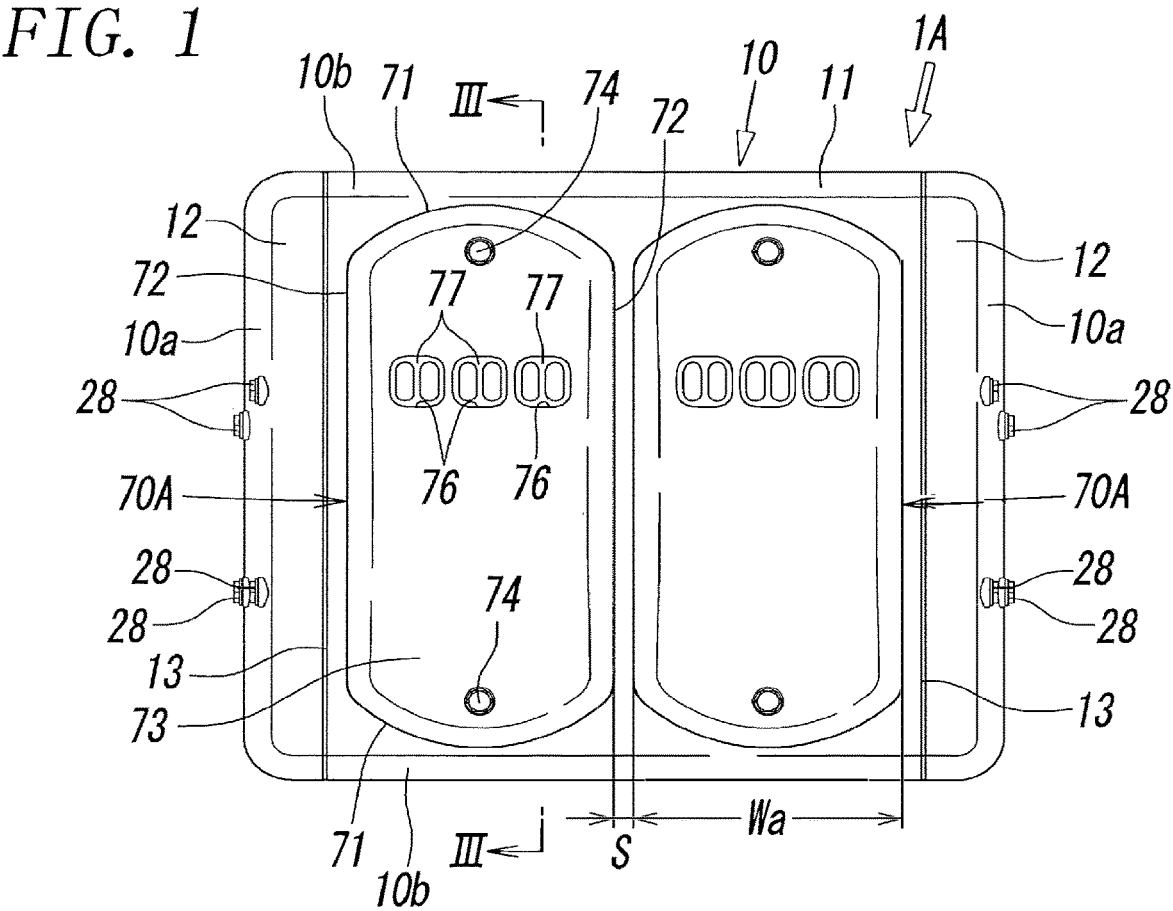
FIG. 1 is a plan view of a waterproof manifold electromagnetic valve according to a first embodiment of the present invention.
Figure 2:
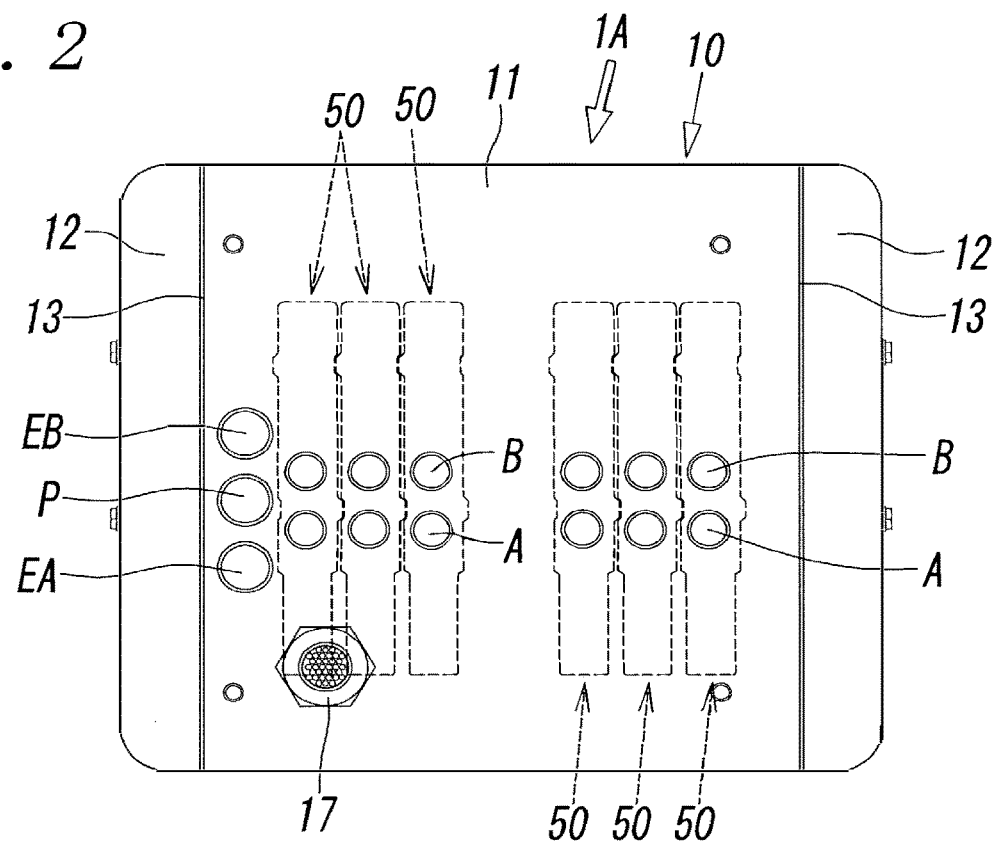
FIG. 2 is a bottom view of the waterproof manifold electromagnetic valve illustrated in FIG. 1.

FIG. 1 to FIG. 6 illustrate a waterproof manifold electromagnetic valve according to a first embodiment of the present invention. A manifold electromagnetic valve 1A includes a manifold 10, six electromagnetic valves 50, mounted on the manifold 10, and two waterproof covers 70A, which cover the electromagnetic valves 50. The six electromagnetic valves 50 are divided into two valve groups BG1 to be mounted on the manifold 10. Three electromagnetic valves 50 belonging to one of the valve groups BG1 are collectively covered with one of the waterproof covers 70A, and three electromagnetic valves 50 belonging to the other one of the valve groups BG1 are collectively covered with the other one of the waterproof covers 70A.

The manifold 10 is a single-unit manifold made of metal or synthetic resin, and includes a manifold body 11, which is an integrated unit, and end plates 12 attached to a first end and a second end of the manifold body 11 with gaskets 13 interposed therebetween. In the following description, a vertical direction of the manifold 10 refers to a direction connecting the two end plates 12 and corresponds to a longitudinal direction, a lateral direction of the manifold 10 refers to a direction orthogonal to the longitudinal direction and corresponds to a widthwise direction, and a vertical direction of the manifold 10 refers to a height direction.

Both end surfaces $10a$ of the manifold 10 in the longitudinal direction and both end surfaces $10b$ of the manifold 10 in the lateral direction are inclined to gradually increase the length and the width of the manifold 10 toward the bottom surface of the manifold 10 (to be flared).

The manifold body 11 includes a feed flow path 14 at the center, two discharge flow paths 15A and 15B on both sides of the feed flow path 14, and a duct 16 accommodating electric wirings extend through the manifold body 11 in the longitudinal direction. Both ends of the feed flow path 14, the discharge flow paths 15A and 15B, and the duct 16 are closed with the gaskets 13 and the end plates 12. Components denoted with the reference signs 28 in the drawings are plate-fastening screws for fixing the end plates 12 to end surfaces of the manifold body 11.

The feed flow path 14 and the discharge flow paths 15A and 15B are respectively connected to a feed port P and discharge ports EA and EB, which are open in the bottom surface of the manifold body 11 at positions near one end of the manifold body 11 in the longitudinal direction. The duct 16 accommodates feeders and signal lines extending from an electric cable 17 connected to the bottom surface of the manifold body 11. The electric cable 17 is connected to a control device, not illustrated. The first embodiment is an example of a structure in which the electromagnetic valves 50 of the manifold electromagnetic valve 1A are connected to the control device with individual signal lines and feeders for parallel transmission of signals.

On the upper surface of the manifold body 11, mount areas 18A each allowing a group of three electromagnetic valves 50 to be mounted thereon are disposed at two portions apart from each other in the longitudinal direction of the manifold body 11. In each mount area 18A, three valve mount surfaces 19 are arranged side by side adjacent to each other. Each electromagnetic valve 50 is mounted on the corresponding one of the valve mount surfaces 19 with a gasket 51 interposed therebetween. Thus, two valve mount portions 20A, in each of which three electromagnetic valves 50 are mounted parallel to each other with a fine inter-valve distance L1 left between each other, are formed. The reference signs 52 in the drawings refer to electromagnetic-valve fastening screws for fastening the electromagnetic valves 50 to the manifold body 11. The reference signs 21 refer to threaded holes formed in the manifold body 11 for screwing down the electromagnetic-valve fastening screws 52.

The valve mount surfaces 19 extend in the lateral direction (in the widthwise direction) of the manifold body 11. Thus, the electromagnetic valves 50 are disposed while having the lengthwise direction oriented in the widthwise direction of the manifold body 11.

The two mount areas 18A are spaced apart from each other. Thus, two electromagnetic valves 50 at ends of two valve mount portions 20A adjacent to each other are spaced apart from each other by an inter-mount-portion distance L2, which is larger than the inter-valve distance L1.

The three valve mount surfaces 19 have the same structure. Each of the valve mount surfaces 19 includes one feed hole 22, two output holes 23A and 23B on both sides of the feed hole 22, and two discharge holes 24A and 24B on both outer sides of the two output holes 23A and 23B. The feed hole 22 is connected to the feed flow path 14, and connected to a feed opening 53 in an undersurface of the corresponding electromagnetic valve 50. The two discharge holes 24A and 24B are respectively connected to two discharge flow paths 15A and 15B, and respectively connected to two discharge ports 54A and 54B in the undersurface of the electromagnetic valve 50. The two output holes 23A and 23B are respectively connected to two output ports A and B formed in the undersurface of the manifold body 11, and respectively connected to two output openings 55A and 55B formed in the undersurface of the electromagnetic valve 50.

The six electromagnetic valves 50 are double-pilot, 5-port electromagnetic valves having the same structure, and each include a main valve portion 50a and a pilot valve portion 50b.

The main valve portion 50a includes a valve body 56, a valve hole 57 formed in the valve body 56, a spool 58 slidably accommodated in the valve hole 57, and an end block 59 and a manual block 60, respectively attached to a first end and a second end of the valve body 56. The end block 59 and the manual block 60 each accommodate a pilot piston, not illustrated.

The pilot valve portion 50b includes two pilot valves 62a and 62b arranged vertically, which are 3-port valves operated electromagnetically. The lower end portion of the pilot valve portion 50b is disposed in the duct 16 through an opening 25 in the manifold body 11, and connected in parallel to the signal line and the feeder in the duct 16. The lower end portion is automatically connected with an electric connector, not illustrated, interposed therebetween in response to the electromagnetic valve 50 being mounted on the valve mount surface 19 of the manifold 10.

Figure 3:
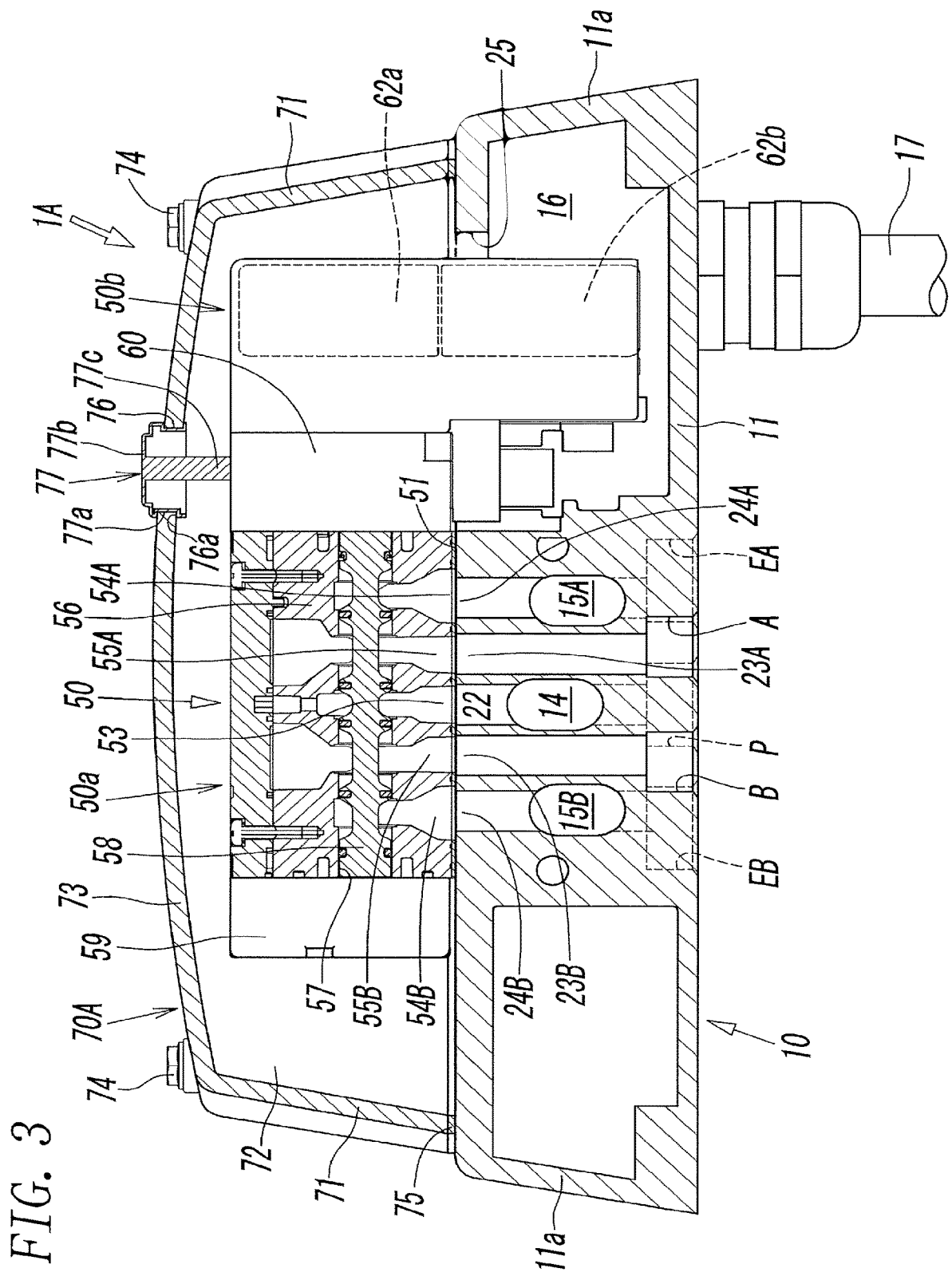
FIG. 3 is a cross sectional view of the waterproof manifold electromagnetic valve taken along line III-III in FIG. 1.
Figure 4:
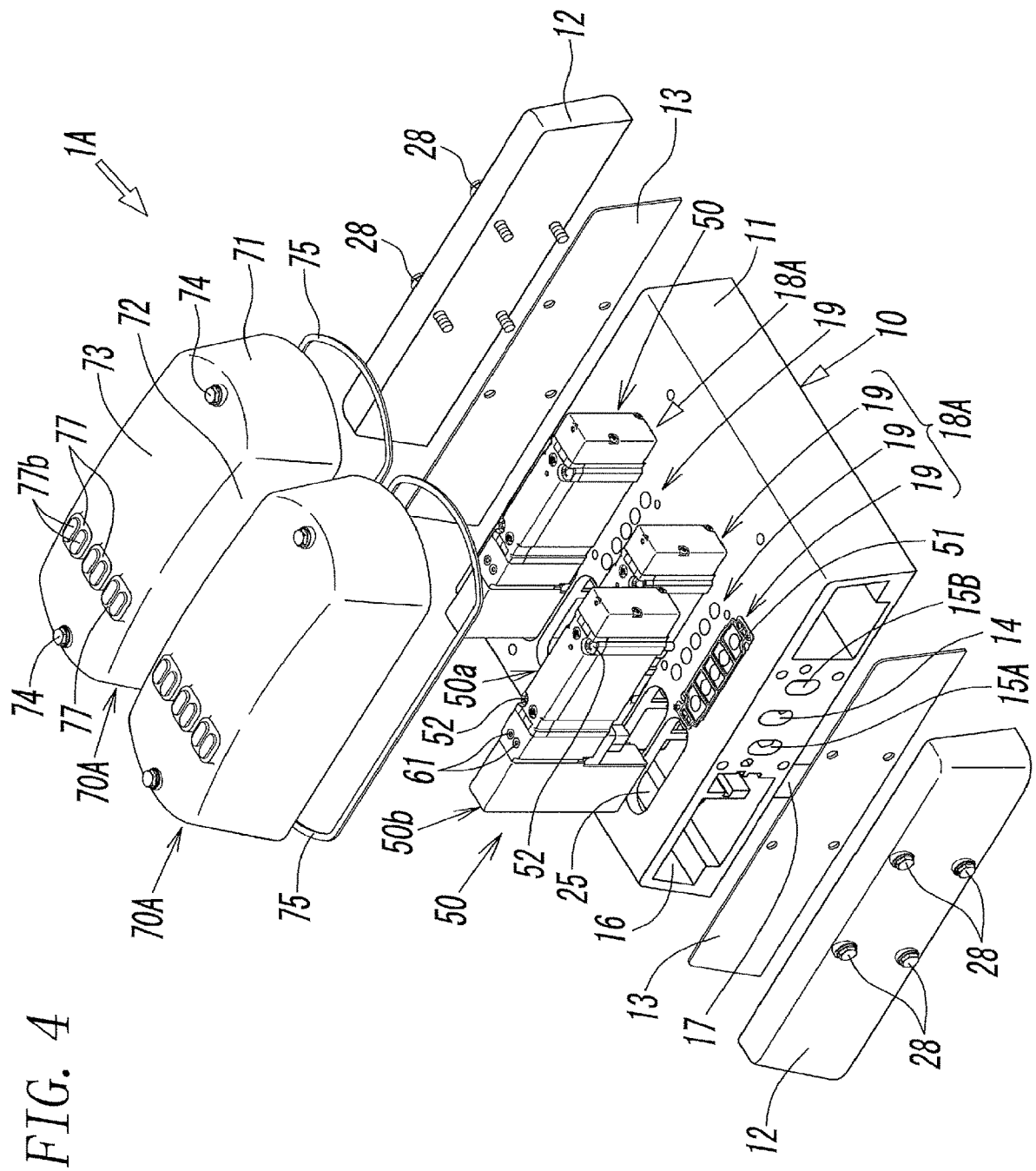
FIG. 4 is an exploded perspective view of the manifold electromagnetic valve illustrated in FIG. 1, where part of the electromagnetic valve is omitted.
Figure 5:
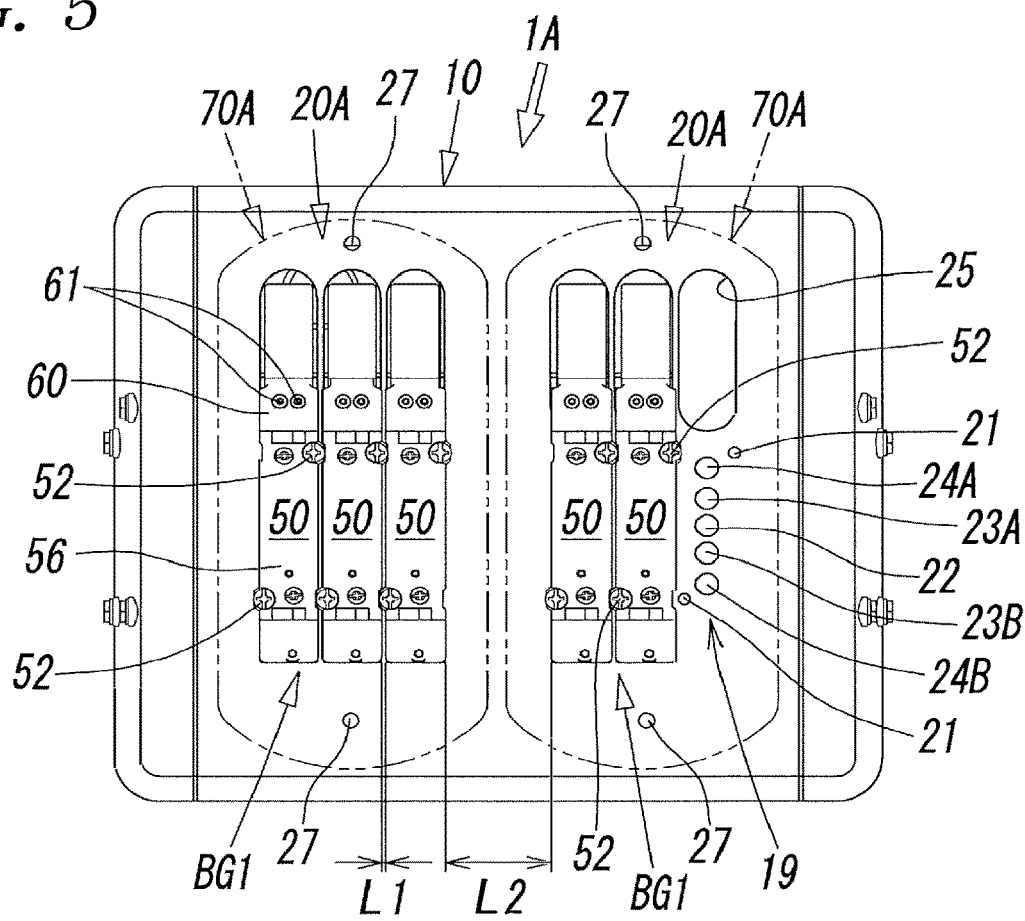
FIG. 5 is a plan view of the manifold electromagnetic valve illustrated in FIG. 1, from which waterproof covers and part of the electromagnetic valves are removed.
Figure 6:
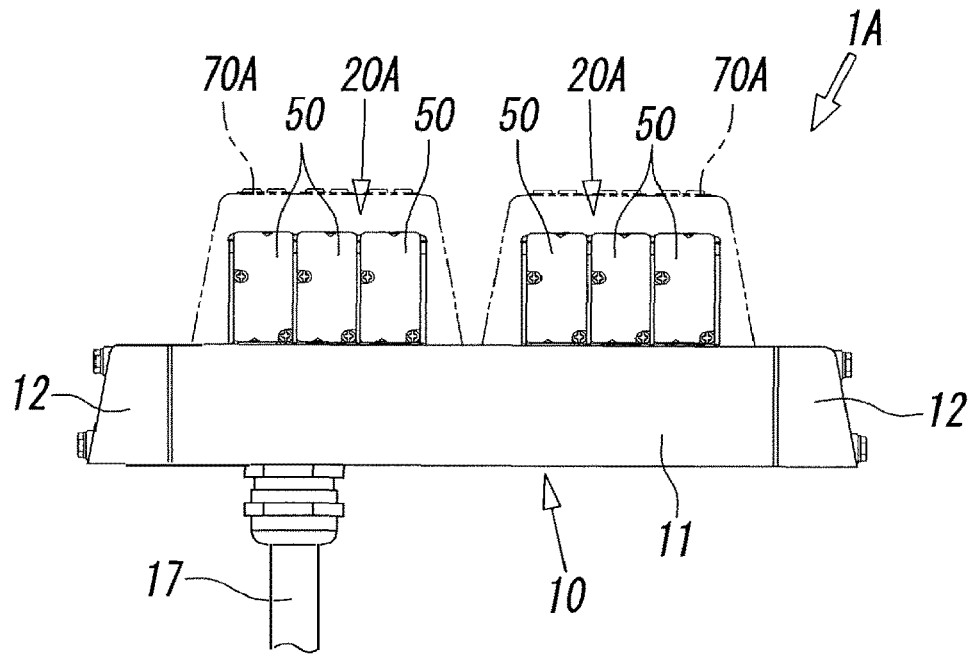
FIG. 6 is a front view of the manifold electromagnetic valve illustrated in FIG. 5, where all the electromagnetic valves are mounted on a manifold.

When the pilot valve 62a is turned on, a pilot fluid operates to drive the pilot piston inside the manual block 60 and to move the spool 58 to the left in FIG. 3. When the pilot valve 62b is turned on, the pilot fluid operates to drive the pilot piston inside the end block 59 and to move the spool 58 to the right in FIG. 3. Such reciprocation of the spool 58 enables switching of the connection state of the flow path connecting the feed hole 22 and the two output holes 23A and 23B to each other and the connection state of the flow path connecting the two output holes 23A and 23B and the two discharge holes 24A and 24B to each other.

Two manual buttons 61, which allow a user to manually switch the state of the flow path with the pilot valves, are disposed on the upper surface of the manual block 60 while being arranged in the widthwise direction of the manual block 60.

Each waterproof cover 70A is a component having, in a plan view, a substantially rectangular shape extending in the lengthwise direction of the electromagnetic valve 50, and having an inverted U-shaped cross section. The waterproof cover 70A includes end walls 71 located on one end and the other end in the lengthwise direction, side walls 72 located on one end and the other end in the widthwise direction, and an upper wall 73. The two end walls 71 are surfaces curving outward into a convex shape in the lengthwise direction of the waterproof cover 70A. The two side walls 72 are flat surfaces extending straight in the lengthwise direction of the waterproof cover 70A. The end walls 71 and the side walls 72 are inclined in such directions as to be gradually flared from the upper wall 73 toward the lower end of the waterproof cover 70A, in other words, in directions so that the diameter of the waterproof cover 70A in the lengthwise direction and the diameter of the waterproof cover 70A in the widthwise direction increase gradually. The upper wall 73 gently curves outward (upward) into a convex shape in only the lengthwise direction of the waterproof cover 70A. The curved shape is symmetric with respect to the center of the lengthwise direction of the waterproof cover 70A. The two waterproof covers 70A have the same shape and the same size.

Each waterproof cover 70A is fixed to the manifold 10 with a gasket 75 interposed therebetween with two cover attachment screws 74 at two positions, which are at first and second ends in the lengthwise direction and center positions in the lateral direction. The manifold 10 thus has threaded holes 27 that allow the cover attachment screws 74 to be screwed thereon.

Each waterproof cover 70A has rectangular operation holes 76 at positions corresponding to the manual buttons 61 of the electromagnetic valve 50. Rectangular hole covers 77 are fluid-tightly attached to the operation holes 76. The waterproof cover 70A covers three electromagnetic valves 50. Thus, each waterproof cover 70A has the three operation holes 76, and the hole covers 77 are attached to the respective operation holes 76.

The hole covers 77 are made of a flexible material such as synthetic resin or rubber. Each hole cover 77 is removably attached to the corresponding operation hole 76 while having a lock groove 77a at the outer periphery of the hole cover 77 fitted to and locked on a hole edge 76a of the operation hole 76. Each hole cover 77 includes two flexible press portions 77b protruding upward, and two push rods 77c extending downward from the respective press portions 77b. Each push rod 77c is connected integrally with or separate from the corresponding press portion 77b, and the lower end of the push rod 77c is in contact or adjacent to the corresponding manual button 61. When the press portions 77b are pressed from above, the manual buttons 61 are operable with the push rods 77b. Here, the two press portions 77b need to be flexible so as to be separately deformed when pressed.

The hole covers 77 may be removed from the operation holes 76 to operate the manual buttons 61.

The waterproof cover 70A is made of a translucent synthetic resin having such a thickness as to bear, for example, a blow of high-temperature, high-pressure wash water or a steam jet. However, the waterproof cover 70A does not need to be completely transparent, and may be partially or entirely colored. For example, when the electromagnetic valve 50 includes an indicator lamp, the waterproof cover 70A only needs to have a transparent portion at at least a portion corresponding to the indicator lamp.

Desirably, the surface of the waterproof cover 70A is entirely flat without protrusions and depressions except at portions of the cover attachment screws 74 and the operation holes 76 to prevent impurities such as dregs or dirt from adhering to the surface to enhance the cleanability.

From the same point of view, the waterproof cover 70A desirably has such a size, particularly, such a width Wa as to allow a gap S larger than the inter-valve distance L1 and smaller than an inter-mount-portion distance L2 to be formed between adjacent waterproof covers 70A. The surface of the manifold 10 is exposed to the outside through the gap S. The gap S has its width gradually increasing upward, that is, toward the upper surfaces of the waterproof covers 70A.

In the present embodiment, the six electromagnetic valves 50 are divided into two valve groups BG1 each including three valves to be mounted on the manifold 10. The valve mount portions 20A on each of which three electromagnetic valves are mounted are spaced apart from each other on the manifold 10. Each waterproof cover 70A having a small size and covering the three electromagnetic valves 50 is attached to the corresponding valve mount portion 20A. Thus, compared to the case where all the six electromagnetic valves 50 are collectively covered with a large-sized waterproof cover, the structure according to the present embodiment can solve problems such as strength degradation or distortion of a waterproof cover due to an enlargement of a waterproof cover, or can eliminate the need for taking measures to retain the strength of a waterproof cover by, for example, forming a reinforcing rib.

Figure 7:
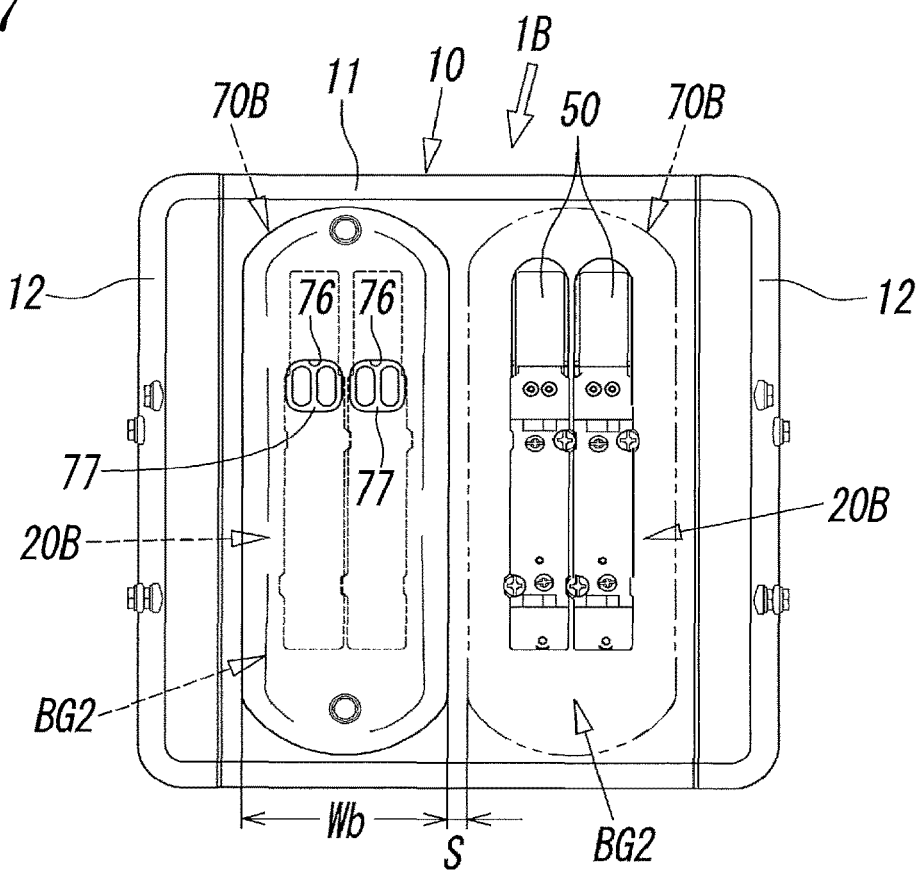
FIG. 7 is a plan view of a waterproof manifold electromagnetic valve according to a second embodiment of the present invention, where part of the waterproof covers is omitted.

FIG. 7 illustrates a waterproof manifold electromagnetic valve according to a second embodiment of the present invention. A manifold electromagnetic valve 1B according to the second embodiment includes four electromagnetic valves 50 in total, which are divided into two valve groups BG2 each including two electromagnetic valves to be mounted on the manifold 10. Thus, two valve mount portions 20B on each of which two electromagnetic valves 50 are mounted are formed. A waterproof cover 70B covering the two electromagnetic valves 50 is attached to each of the valve mount portions 20B. Thus, the quantity of the waterproof covers 70B is two, as in the quantity of the valve mount portions 20B. The quantity of the operation holes 76 formed in the waterproof cover 70B is also two, as in the quantity of the electromagnetic valves 50 covered by each waterproof cover 70B. A width Wb of the waterproof cover 70B is smaller than the width Wa of the waterproof cover 70A according to the first embodiment.

The manifold electromagnetic valve 1B according to the second embodiment differs from the manifold electromagnetic valve 1A according to the first embodiment in the points such as the total quantity of the electromagnetic valves 50, the quantity of the valve mount portions 20B, the quantity of electromagnetic valves 50 on each valve mount portion 20B, and the width Wb of the waterproof cover 70B, but substantially the same as the manifold electromagnetic valve 1A according to the first embodiment in other points of the structure and effects. Thus, the main components having the same structure between both embodiments are denoted with the same reference signs as the first embodiment without describing further.

As in the manifold electromagnetic valve 1B according to the second embodiment, the manifold electromagnetic valve 1A according to the first embodiment may divide the six electromagnetic valves 50 into three valve groups BG2 each including two electromagnetic valves 50. In this case, the manifold electromagnetic valve 1A includes three waterproof covers 70B. However, in the cost reduction point of view through reduction of the quantity of components, preferably, the six electromagnetic valves 50 are divided into two valve groups BG1 each including three valves to be covered with two waterproof covers 70A, as in the first embodiment.

Figure 8:
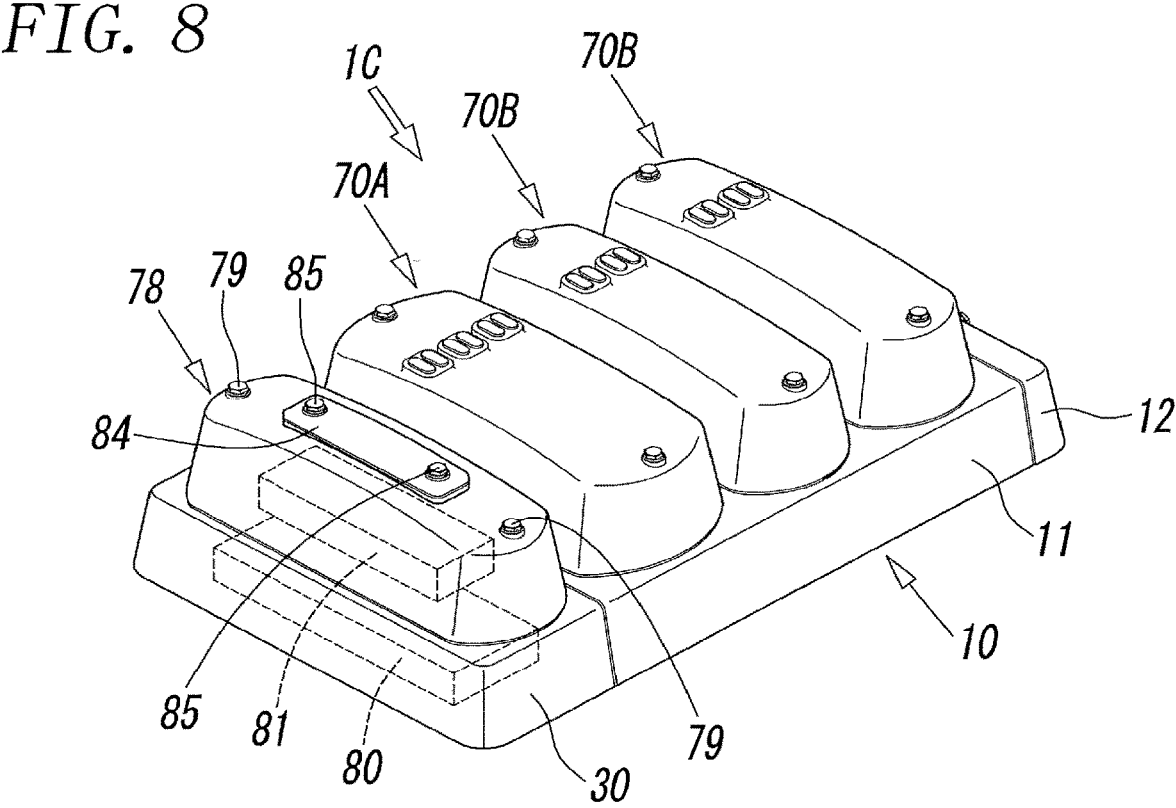
FIG. 8 is a perspective view of a waterproof manifold electromagnetic valve according to a third embodiment of the present invention, viewed from obliquely above.
Figure 9:
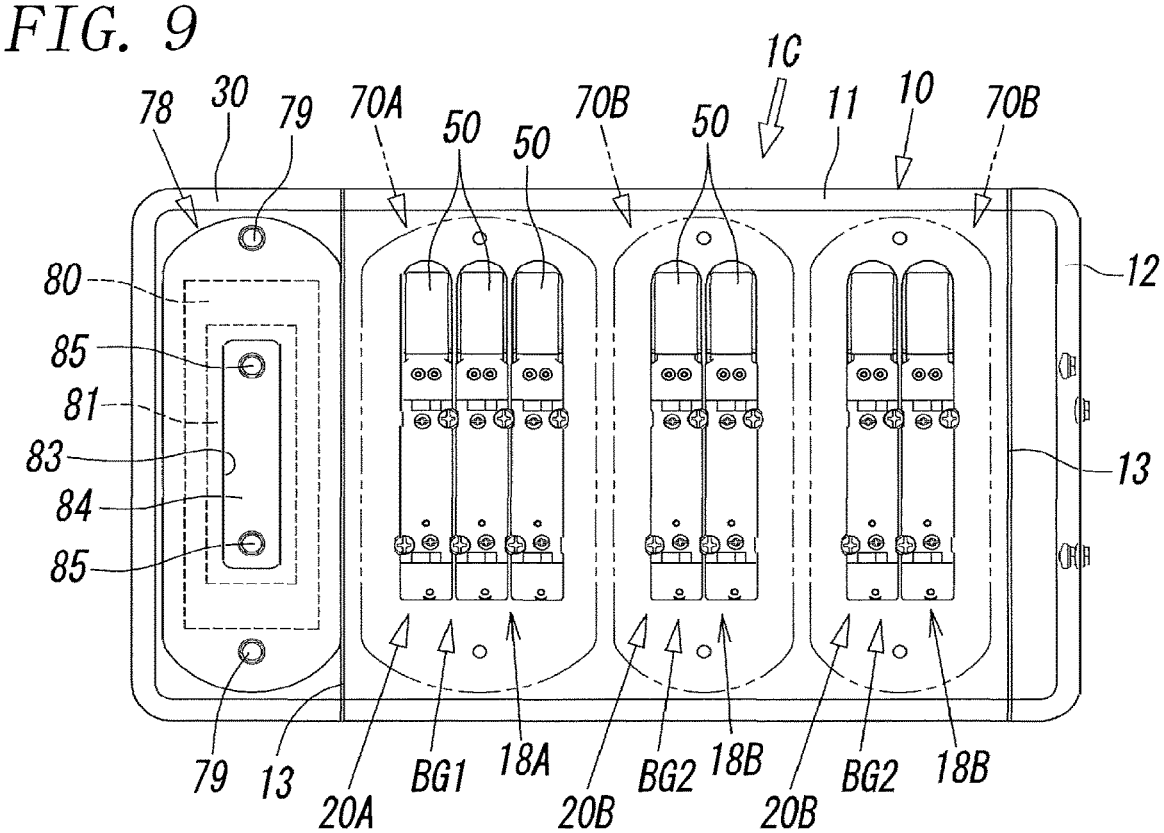
FIG. 9 is a plan view of the manifold electromagnetic valve illustrated in FIG. 8, from which waterproof covers are removed.
Figure 10:
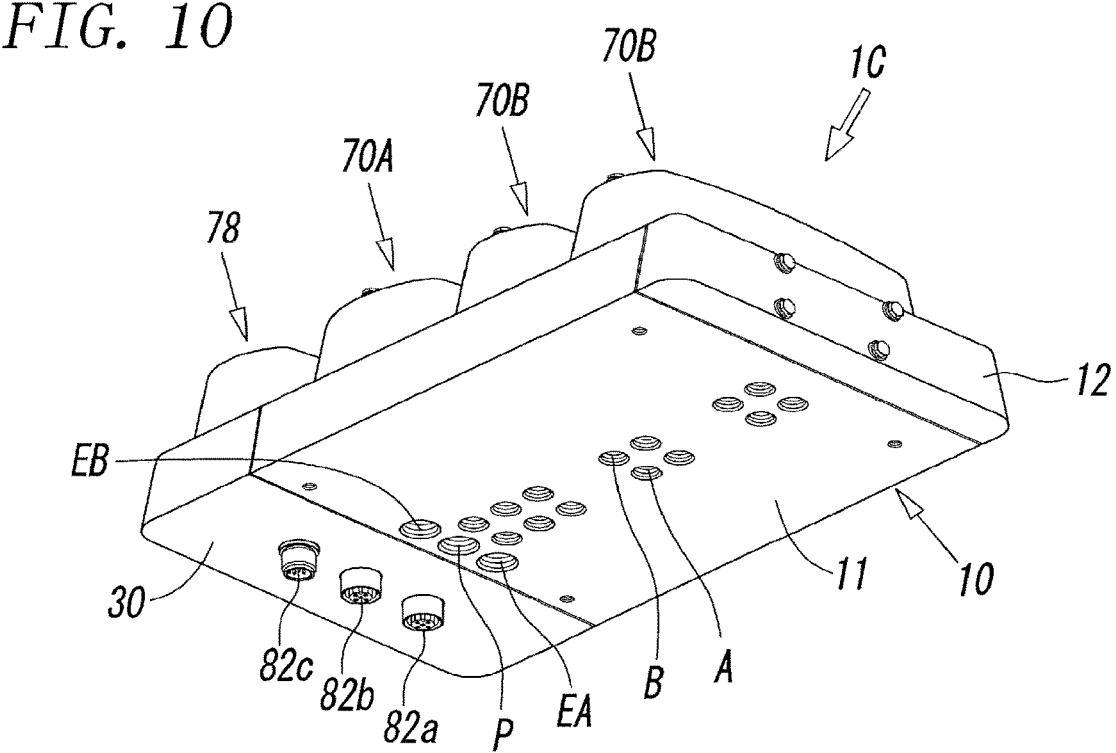
FIG. 10 is a perspective view of the manifold electromagnetic valve illustrated in FIG. 8, viewed from obliquely below.

FIG. 8 to FIG. 10 illustrate a waterproof manifold electromagnetic valve according to a third embodiment of the present invention. A manifold electromagnetic valve 1C according to the third embodiment is a combination of the first embodiment and the second embodiment. The manifold electromagnetic valve 1C includes seven electromagnetic valves 50 in total, divided into one valve group (first valve group) BG1, including three electromagnetic valves, and two valve groups (second valve groups) BG2, each including two electromagnetic valves. The manifold body 11 includes one mount area (first mount area) 18A, which allows three electromagnetic valves 50 to be mounted thereon, and two mount areas (second mount areas) 18B, each of which allows two electromagnetic valves 50 to be mounted thereon. The mount areas 18A and 18B on each of which three or two electromagnetic valves 50 are mounted form one valve mount portion (first valve mount portion) 20A on which the three electromagnetic valves 50 are mounted, and two valve mount portions (second valve mount portions) 20B on each of which the two electromagnetic valves 50 are mounted. The waterproof cover (first waterproof cover) 70A, which covers three electromagnetic valves 50, is attached to the first valve mount portion 20A, and the waterproof covers (second waterproof covers) 70B, each of which covers two electromagnetic valves 50, are attached to the second valve mount portions 20B.

A control block 30 is attached to one end of the manifold body 11. The control block 30 accommodates a serial-parallel converter 80. An address designation device 81, which designates the address of each electromagnetic valve 50, is disposed on the upper surface of the control block 30. A third waterproof cover 78, which covers the address designation device 81, is attached with two screws 79. Connectors 82a, 82b, and 82c, which connects grounding conductors, feeders, and signal lines from the control device, are disposed on the undersurface of the control block 30. The control block 30 may be integrated with the manifold body 11.

Serial signals transmitted from a control device are converted by the serial-parallel converter 80 into parallel signals. When the parallel signals are input to the electromagnetic valve 50 corresponding to the address designated by the address designation device 81, this electromagnetic valve 50 operates. Thus, the third embodiment is an example of serially transmitting signals between the manifold electromagnetic valve 1C and the control device.

At the center portion of the upper surface of the third waterproof cover 78, an operation hole 83 for operating switching of the address designation device 81 extends in the lengthwise direction of the waterproof cover 78. A hole cover 84 is removably attached to the operation hole 78 with two cover-attachment screws 85.

Compared to the first waterproof cover 70A and the second waterproof cover 70B, the third waterproof cover 78 has a slightly different width, but has substantially the same appearance including the length and the height.

Other points of the structure and effects of the manifold electromagnetic valve 1C according to the third embodiment are substantially the same as those of the manifold electromagnetic valve 1A according to the first embodiment and the manifold electromagnetic valve 1B according to the second embodiment. Thus, the main components the same between the embodiments are denoted with the same components as those of the first and second embodiments without describing.

As in the manifold electromagnetic valve 1A according to the first embodiment, the manifold electromagnetic valve 1C according to the third embodiment can be changed to a type that transmits signals in parallel. This structure eliminates the need of the control block 30.

Conversely, the manifold electromagnetic valve 1A or 1B according to the first or second embodiment may be changed to a type that transmits signals in serial. In this structure, the control block 30 is attached to the manifold body 11.

The manifold electromagnetic valve 1A, 1B, and 1C according to the first to third embodiments can be formed in the following procedure.

Firstly, the total quantity of electromagnetic valves 50 to be mounted on the manifold 10 is determined. The total number is four or more.

When the total quantity of electromagnetic valves 50 is determined, the electromagnetic valves 50 are divided into multiple valve groups (first valve groups) BG1 each including three electromagnetic valves, as in the case of the first embodiment, into multiple valve groups (second valve groups) BG2 each including two electromagnetic valves, as in the case of the second embodiment, or into a combination of at least one first valve group BG1 and at least one second valve group BG1, as in the third embodiment. The quantity of valve groups is thus determined.

Subsequently, to mount the electromagnetic valves 50 divided into groups, the first mount areas 18A each allowing three electromagnetic valves 50 to be mounted thereon are formed on the manifold 10 in the same quantity as the quantity of the first valve groups BG1, as in the first embodiment, the second mount areas 18B each allowing two electromagnetic valves 50 to be mounted thereon are formed on the manifold 10 in the same quantity as the quantity of the second valve group BG2, as in the second embodiment, or the first mount area 18A and the second mount area 18B are formed on the manifold 10 in the same quantity as the quantity of the first valve group BG1 and the quantity of the second valve group BG2, as in the third embodiment.

Alternatively, the first waterproof covers 70A having such a size as to collectively cover three electromagnetic valves 50 and/or the second waterproof covers 70B having such a size as to collectively cover two electromagnetic valves 50 are prepared in the same quantity as the quantity of first mount areas 18A and/or the quantity of second mount areas 18B.

Subsequently, three or two electromagnetic valves 50 are mounted on the mount area 18A or 18B of the manifold 10. Thus, the first valve mount portions 20A on which three electromagnetic valves 50 are mounted and/or the second valve mount portions 20B on which two electromagnetic valves 50 are mounted are formed.

When each waterproof cover 70A or 70B is attached to the corresponding valve mount portion 20A or 20B of the manifold 10 to cover three or two electromagnetic valves 50 mounted on the valve mount portion, the intended waterproof manifold electromagnetic valve 1A, 1B, or 1C is obtained.

In each embodiment, the electromagnetic valves 50 are double-pilot, 5-port electromagnetic valves, but may be single pilot valves, or may be 4-port valves or 3-port valves. Instead of the same structure, the electromagnetic valves 50 may include electromagnetic valves having different structures. For example, electromagnetic valves may include a single pilot electromagnetic valve and a double pilot electromagnetic valve, or a 5-port valve and a 3-port valve. In short, either one or both of the first waterproof cover/covers 70A and the second waterproof cover/covers 70B may be used as long as they cover all the electromagnetic valves.

The manifold electromagnetic valves 1A, 1B, and 1C according to the embodiments are single-unit manifolds, and all the mount areas 18A and 18B are formed on one manifold body 11. Instead, the manifold body 11 may be formed by coupling multiple manifold blocks. In this case, at least one first mount area 18A and/or at least one second mount area 18B is/are formed on each manifold block.

REFERENCE SIGNS LIST 1A, 1B, 1C waterproof manifold electromagnetic valve
18A first mount area
18B second mount area
20A first valve mount portion
20B second valve mount portion
50 electromagnetic valve
61 manifold button
70A first waterproof cover
70B second waterproof cover
76 operation hole
77 hole cover
BG1 first valve group
BG2 second valve group
L1 inter-valve distance
L2 inter-mount-portion distance
S gap

The invention claimed is:

1. A waterproof manifold electromagnetic valve assembly, comprising:
   a manifold including a plurality of first valve mount portions, on each of which three electromagnetic valves are arranged side by side at a predetermined inter-valve distance apart from each other, or a plurality of second valve mount portions, on each of which two electromagnetic valves are arranged side by side at the inter-valve distance apart from each other, or including at least one of the first valve mount portions and at least one of the second valve mount portions, and electromagnetic valves at end portions of valve mount portions adjacent to each other being spaced apart from each other an inter-mount-portion distance that is larger than the inter-valve distance; and
   waterproof covers attached to the respective valve mount portions of the manifold to each collectively cover the three or two electromagnetic valves mounted on the corresponding valve mount portion,
   wherein a gap is formed between adjacent waterproof covers, and the gap has a size that is larger than the inter-valve distance and smaller than the inter-mount-portion distance, and that allows a surface of the manifold to be exposed to an outside through the gap.

2. The waterproof electromagnetic valve assembly according to claim 1, wherein the gap between the adjacent waterproof covers gradually increases toward upper surfaces of the waterproof covers.

3. The waterproof electromagnetic valve assembly according to claim 1,
   wherein the waterproof covers have a thin and long shape extending in a lengthwise direction of the electromagnetic valves, upper surfaces of the waterproof covers curve outward into a convex shape in a lengthwise direction of the waterproof covers, and a curved shape of the upper surfaces is symmetric with respect to a center in the lengthwise direction of the waterproof covers.

4. The waterproof electromagnetic valve assembly according to claim 3,
   wherein the waterproof covers are each screwed to the manitbld at two positions that are at a first end portion and a second end portion of the lengthwise direction of the cover and center portions in a widthwise direction of the cover.

5. The water roof electromagnetic valve assembly according to claim 1,
wherein the assembly includes at least one of a plurality of first waterproof covers each covering three electromagnetic valves or a plurality of second waterproof covers each covering two electromagnetic valves, the plurality of first waterproof covers have the same shape and the same size and the plurality of waterproof covers have the same shape and the same size.

6. The waterproof electromagnetic valve assembly according to claim 1,
wherein each of the electromagnetic valves includes a manual button for a ma al operation on an upper surface of the electromagnetic valve covered with the conesponding one of the waterproof covers, and
wherein each of the waterproof covers has an operation hole that enables an operation of the manual button at a position corresponding to the manual button, and a hole cover is attached to the operation hole.

7. The waterproof electromagnetic valve assembly according to Claim
wherein the manifold is a single-unit manifold, and the manifold includes all the valve mount portions.

8. The waterproof electromagnetic valve assembly according to claim 1,
wherein the manifold is formed from a plurality of manifold blocks coupled to each other, and each of the manifold blocks includes at least one first valve mount portion and/or at least one second valve mount portion.

9. A method for manufacturing a waterproof manifold electromagnetic valve assembly in which at least four electromagnetic valves and at least two waterproof covers which cover the electromagnetic valves are mounted on an upper surface of one a manifold, the method comprising:
dividing all the electromagnetic. valves mounted on the manifold into at least one of at least one first valve group including three electromagnetic valves and at least one second valve group including two electromagnetic valves to determine at least one of a quantity of the first valve group and a quantity of the second valve group;
forming, on the upper surface of the manifold, at least one of at least one first mount area allowing three electromagnetic valves to be mounted thereon and at least one second mount area allowing two electromagnetic valves to be mounted thereon, at least one of a quantity of the first mount area and a quantity of the second mount area being equal to at least one of the quantity of the first valve group and the quantity of the second valve group;
mounting three or two electromagnetic valves on each of the mount areas of the manifold to form a plurality of first valve mount portions on which three electromagnetic valves are mounted, or a plurality of second valve mount portions on which two electromagnetic valves are mounted, or at least one first valve mount portion and at least one second valve mount portion; and
attaching, to each of the valve mor n portions of the manifold, a waterproof cover to cover the three or two electromagnetic valves mounted on the valve mount portion,
wherein the three or two electromagnetic valves of each mount portion are arranged side by side at a predetermined inter-valve distance apart from each other, and electromagnetic valves at end portions of valve mount portions adjacent to each other are spaced apart from each other an inter-mount-portion distance that is larger than the inter-valve distance, and
wherein a gap is formed between adjacent waterproof covers, and the has a size that is larger than the inter-valve distance, and smaller than the inter-mount-portion distance, and that allows a surface of the manifold to he exposed to an outside through the gap.

* * * * *